United States Patent [19]

Amano et al.

[11] 4,363,307

[45] Dec. 14, 1982

[54] METHOD FOR ADJUSTING THE SUPPLY OF FUEL TO AN INTERNAL COMBUSTION ENGINE FOR AN ACCELERATION CONDITION

[75] Inventors: Matsuo Amano, Hitachi; Yasunori Mouri; Osamu Abe, both of Katsuta; Seiji Suda, Mito; Takao Sasayama, Hitachi, all of Japan

[73] Assignee: Hitachi, Ltd., Tokyo, Japan

[21] Appl. No.: 240,857

[22] Filed: Mar. 5, 1981

[30] Foreign Application Priority Data

Mar. 7, 1980 [JP] Japan .................................. 55-27936

[51] Int. Cl.[3] .......................... F02D 5/00; F02B 3/00; G05B 15/02

[52] U.S. Cl. .................................... 123/492; 123/491; 123/480

[58] Field of Search ........................ 123/492, 491, 480

[56] References Cited

U.S. PATENT DOCUMENTS

| | | | |
|---|---|---|---|
| 3,898,962 | 8/1975 | Honig et al. | 123/492 |
| 4,126,107 | 11/1978 | Harada et al. | 123/491 |
| 4,201,161 | 5/1980 | Sasayama et al. | 123/492 |
| 4,245,605 | 1/1981 | Rice et al. | 123/492 |
| 4,257,377 | 3/1981 | Kimogawa et al. | 123/492 |
| 4,310,888 | 1/1982 | Furuhashi et al. | 123/491 |

*Primary Examiner*—Raymond A. Nelli

*Attorney, Agent, or Firm*—Antonelli, Terry & Wands

[57] ABSTRACT

An engine control system with a microcomputer is disclosed which controls the amount of fuel injection of a spark ignition engine having a fuel injection system. In each intake process of a cylinder of the engine, a regular fuel injection is effected. An acceleration fuel injection is effected only once in each interval of said regular fuel injection in the case where the task actuated in predetermined cycles regardless of the engine rotational speed decides that the engine is in an accelerated condition.

5 Claims, 7 Drawing Figures

METHOD FOR ADJUSTING THE SUPPLY OF FUEL TO AN INTERNAL COMBUSTION ENGINE FOR AN ACCELERATION CONDITION

BACKGROUND OF THE INVENTION

The present invention relates to a fuel injection system electronically controlled for an internal combustion engine, or more in particular to a method for controlling the amount of fuel injection at the time of acceleration.

Various types of engine control systems have so far been suggested which are capable of supplying fuel properly in accordance with the operating conditions including acceleration and deceleration. The specification of U.S. Pat. No. 4,126,107, for example, discloses an electronic fuel injection system which generates primary fuel control pulses in synchronism with the crankshaft rotation. The width of these control pulses is adjusted according to the indications of the various engine transducers and determines the amount of fuel to be injected. The system also includes an air flow rate transducer whose output signal is monitored by a comparator. When the air flow rate signal undergoes very rapid changes, the comparator triggers a secondary pulse generator which supplies additional fuel injection control pulses to admit more fuel. The width of this secondary pulse is constant, and the occurrence thereof is temporarily independent of the primary pulses.

SUMMARY OF THE INVENTION

Accordingly, an object of the present invention is to provide a method of controlling the engine acceleration suitable for a control circuit of stored program type using a processor.

Another object of the present invention is to provide a method of engine acceleration control in which a proper amount of fuel is always supplied to the engine regardless of the engine rotational speed at the time before the acceleration thereof.

These objects will be described more in detail. In an engine control system of stored program type using a processor, various tasks are performed by a single processor, so that the task of monitoring whether the engine is in accelerated condition or not and injecting additional fuel if required is accomplished at regular intervals of time. If the cycle of this task is enlarged, the decision on an engine accelerated condition and additional fuel injection are delayed, with the result that the concentration of the mixture gas in the cylinder is reduced thereby often temporarily reducing the engine torque. In an extreme case of reduction in concentration, a misfire may occur. If the particular cycle is shortened, by contrast, it may be that at the time of acceleration from low speed ranges, a plurality of additional fuel injections may take place in a single process of intake into each cylinder of the engine. The mixture gas in the cylinder will increase to an excessively high level of concentration, so that the obnoxious materials in the exhaust gas are likely to increase in amount. The present invention is intended to overcome these problems.

According to the present invention, there is provided a method of engine acceleration control, in which an injector is opened for a regular fuel injection time calculated from parameters indicating the engine load, in synchronism with the engine rotational speed and in cycles corresponding to the intake process of the engine cylinder; it is determined at regular intervals of time whether or not the engine is being accelerated regardless of the engine rotational speed; and when it is decided that the engine is being accelerated, the injector is opened for a length of time equal to a predetermined reference maximum fuel injection time less the regular fuel injection time calculated as above, only once in a single interval of the injector opening operation in a cycle corresponding to the cylinder intake process.

DESCRIPTION OF THE PREFERRED EMBODIMENTS

Figure 1:
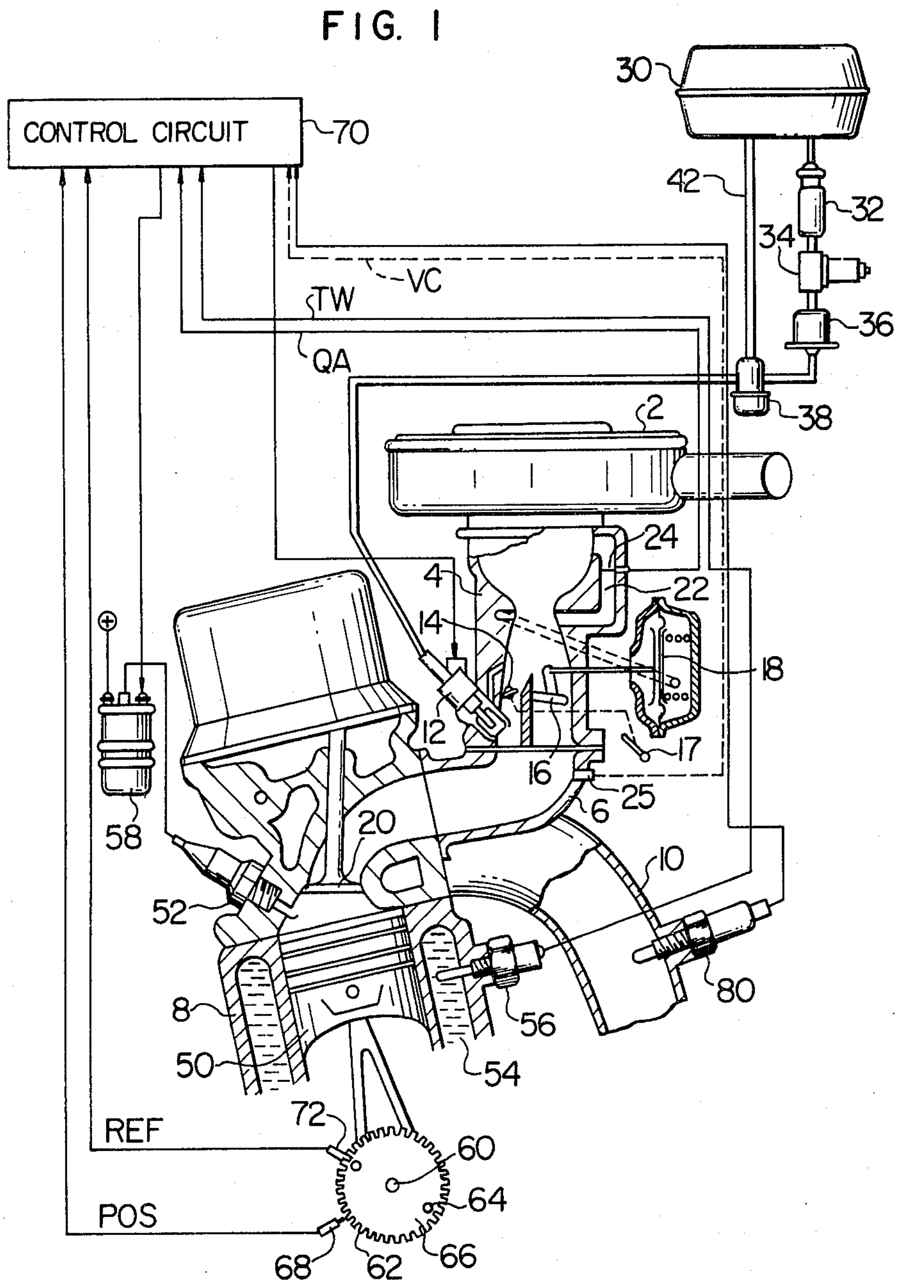
FIG. 1 is a system diagram showing an embodiment of the present invention.

An embodiment of the present invention will be described below with reference to the system diagram of FIG. 1 showing an electronic engine control system.

The air is drawn in a throttle chamber 4 through an air cleaner 2. Fuel is injected from an injector 12 positioned down-stream of a throttle valve 14 interlocked with an accelerating pedal 17. A mixture of air and a fuel gas is introduced into a cylinder 8 through an intake manifold 6 and an intake valve 20. With the increase in the flow rate of the air introduced, the negative pressure in the throttle chamber 4 increases and a diaphragm 18 operates. A throttle valve 16 opens, thus preventing the air intake resistance from increasing. The part upstream of the throttle valves 14 and 16 takes the form of a venturi tube. The flow rate of the air introduced to the engine is easured by a thermal type air flow sensor 24 arranged in an air bypass 22 opening to the narrowest part of the venturi tube.

The fuel is supplied to the injector 12 from a fuel tank 30 through a fuel dumper 34, a fuel filter 36, and a fuel pressure regulator 38. The fuel pressure regulator 38 regulates the flow rate of the fuel returned to the fuel tank 30 via a return pipe 42 in such a manner as to maintain constant the difference between the pressure of the fuel supplied to the injector 12 and the internal pressure of the intake manifold 6.

The mixture gas drawn in the cylinder 8 from the intake valve 20 is ignited and combusted after a compression step. The gas generated by the combustion pressure down a piston 50 and is discharged through an exhaust valve (not shown) and an exhaust tube 10. The concentration of the oxygen $O_2$ contained in the gas is detected by a $\lambda$ sensor 80. The temperature of cooling water 54 for cooling the cylinder 8, on the other hand, is detected by a temperature sensor 56.

An engine shaft 60 securely carries a rotary member 66 of magnetic material having teeth 62 at intervals of, say, 0.5 degrees and two protrusions 64 on one side thereof at intervals of 180 degrees in case of a four-cylinder engine. A crank position sensor 68 is arranged in opposed relation with the teeth 62 and generates a position pulse POS for each 0.5-degree rotation of the crank shaft, which position pulse is supplied to a control circuit 70 including a microcomputer. A crank angle sensor 72 is arranged in opposed relation with the protrusions 64 and generates a reference crank angle pulse REF for each 180-degree rotation of the engine shaft. The pulse REF is supplied to the control circuit 70. The output TW of the water temperature sensor 56 and the electrical signal QA associated with the air flow rate which is produced from the air flow sensor 24 are also applied to the control circuit 70. In response to these signals applied thereto, the control circuit 70 produces a control signal, whereby the injector 12 and the ignition coil 58 are driven.

Figure 2:
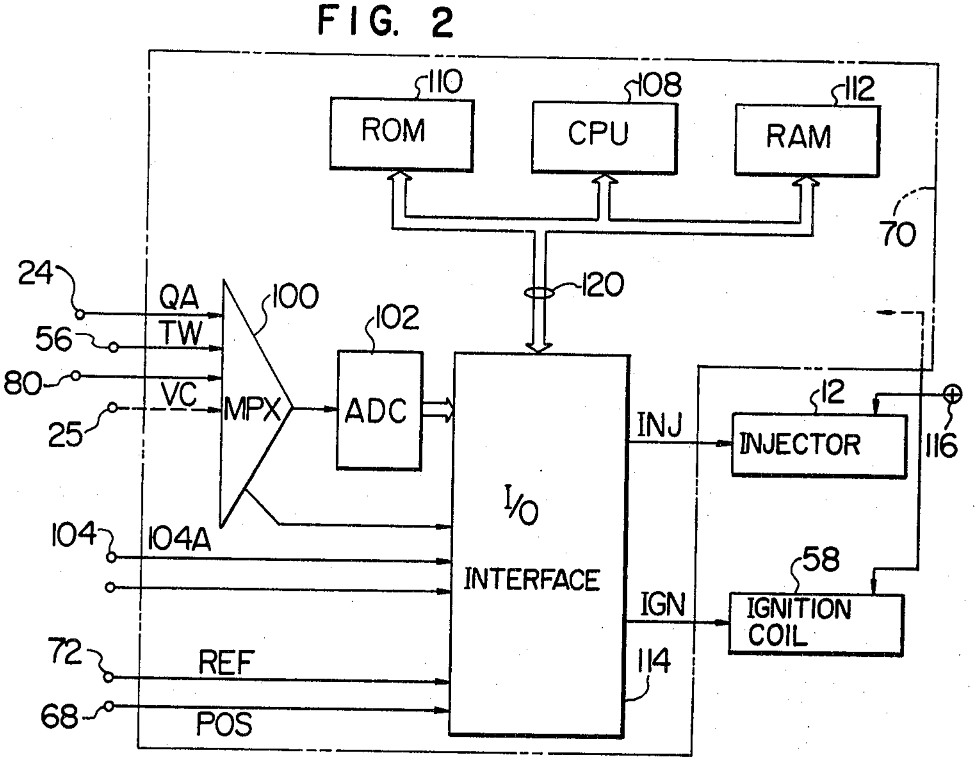
FIG. 2 is a block diagram showing a control circuit 70 in FIG. 1.

A block diagram of a configuration of the control circuit 70 is shown in FIG. 2.

In the drawing, input signals are roughly divided into three types. A first group includes the output QA of the air flow sensor 24 for detecting the intake air flow rate, the output TW of the sensor 56 for detecting the temperature of the engine cooling water and other analog input signals. These analog input signals are applied to a multiplexer (hereinafter referred to as MPS occasionally) 100, in which the outputs of the sensors are selected by time devision and applied to an analog-digital converter 102 for conversion into a digital value. Secondly, an on-off signal is applied, such as a signal 104A supplied from a switch 104 operatively interlocked with the throttle valve 14. This switch 104, which is kept normally on, is turned off by depressing the acceleration pedal 17, thus producing the signal 104A. This signal may be handled as a 1-bit digital signal.

A third type of input signals includes a pulse train such as a reference crank angle pulse CRP and a position pulse signal CPP supplied from the crank angle sensor 72 and the crank position sensor 68 respectively.

An input-output interface circuit 114 supplies a signal to CPU 108 in response to the signals from the A-D converter 102, the switch 104 and the sensors 68 and 72. The CPU 108 makes calculations using the data obtained from the input-output interface 114 according to the various programs stored in a read-only memory (which may hereinafter sometimes be referred to as ROM) 110. For temporary storage required for these calculations, a radom access memory (which may hereinafter sometimes be referred to as RAM) 112 is used. The CPU 108, the read only memory 110, the random access memory 112, and the input-output interface circuit 114 are connected by a bus line 120 including a data bus, a control bus and an address bus. On the basis of the data calculated at the CPU 108, the input-output interface circuit 114 produces an injection signal INJ and an ignition signal IGN and supplies them to the injector 12 and an ignition coil 58 respectively.

The voltage applied from the power terminal 116 to the circuits and elements making up the control circuit 70 are not shown in the drawing. Further, the injector 12 and the ignition coil 58 include respectively a solenoid for driving the valve and a primary coil for storing the electromagnetic energy. An end of each of these coils is connected to the power terminal 116, and the other end thereof is connected to the input-output interface circuit 114, thus controlling the current flowing into the injector 12 and the ignition coil 58.

Figure 3:
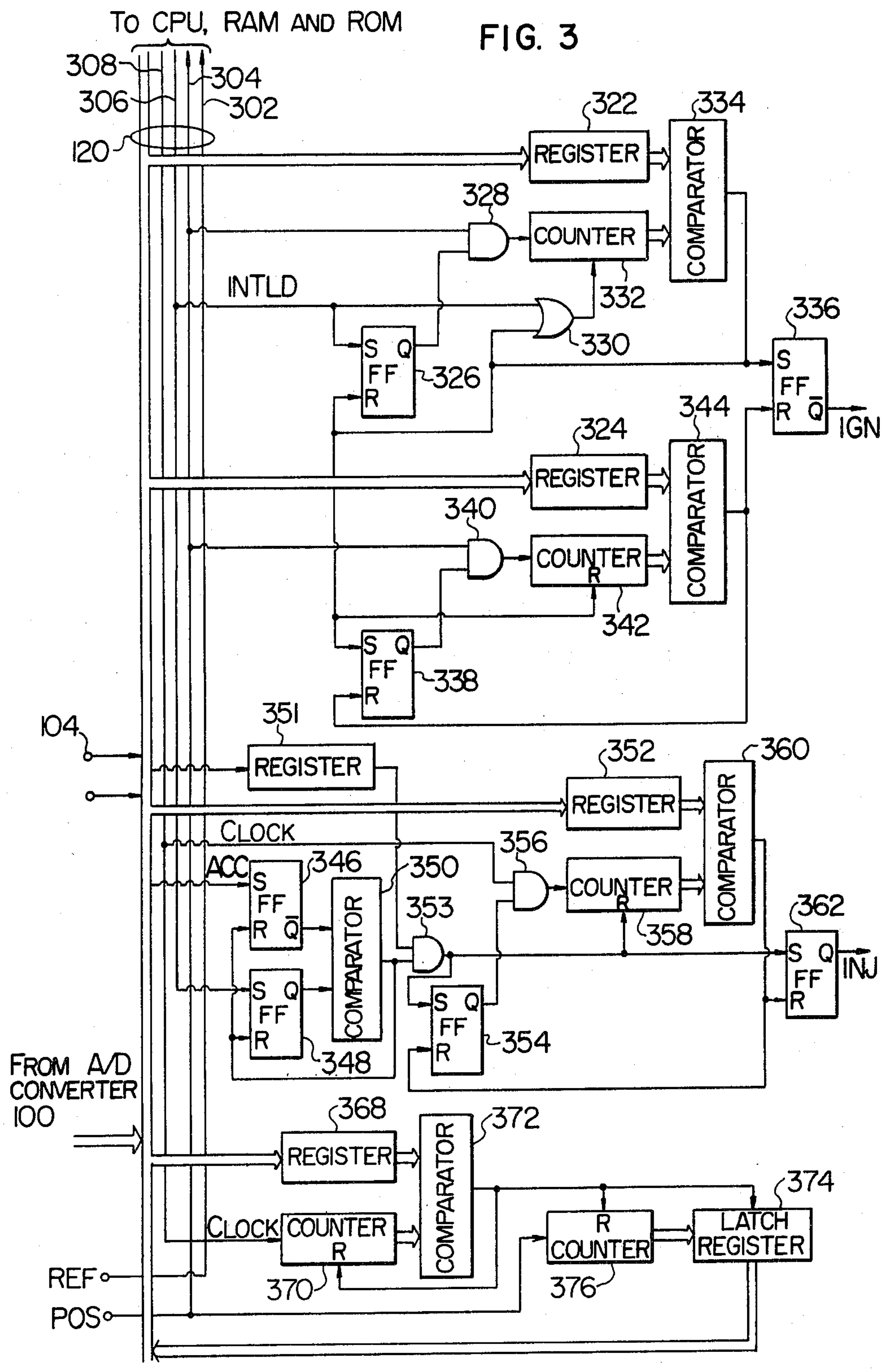
FIG. 3 is a detailed block diagram showing an input-output interface circuit 114 in FIG. 2.

The diagram of FIG. 3 shows the input-output interface circuit 114 of FIG. 2 in detail. In this drawing, the bus 120 includes a data bus, a control bus, and an address bus connected to the CPU 108, ROM 110 and RAM 112, and further includes a line 302 for supplying a position pulse POS from the crank position sensor 68, a line 306 for supplying an initial load pulse INTLD from the CPU 108 and a line 308 for supplying a clock pulse from the CPU 108. A 1-bit digital signal such as supplied from the switch 104 interlocked operatively with the throttle valve 14 and the output of the A-D converter 102 are also supplied via the bus 120 to the CPU 108.

The signal $\theta_{IGN}$ representative of an ignition advance angle and the signal $\theta_{OFF}$ indicative of a period of interruption of the ignition coil current (generally called the dwell angle) among the data calculated at the CPU 108 are stored in registers 322 and 324 respectively at a timing described later. The initial load pulse INTLD obtained from the CPU 108 is produced at a timing slightly delayed from the crank angle pulse REF and represents a predetermined crank angle. This pulse sets a flip-flop 326, and opens an AND gate 328, so that a counter 332 starts counting the position pulses POS. When the count of the counter 332 coincides with the value of $\theta_{IGN}$ set in the register 322, a comparator 334 produces an output, so that the counter 332 and the flip-flop 326 are reset and the counter 332 stops counting while at the same time setting a flip-flop 338. An AND gate 340 opens, and a counter 342 begins to count the position pulses POS. When the count of the counter 342 coincides with the value $\theta_{OFF}$ set in the register 324, the output of a comparator 344 resets the flip-flop 338 and the counter 342 stops counting while at the same time resetting a flip-flop 336. The Q output of the flip-flop 336 is applied to the ignition coil 58 as an ignition signal IGN.

A counter 370 always counts the clock pulses produced at regular intervals of time. When the count value of the counter 370 reaches a value set in a register 368, a comparator 372 produces an output, while at the same time resetting the counter 370. The position pulses POS counted at a counter 376 are latched at a register 374 in the intervals of the pulses having regular cycles thus obtained, and therefore the data indicating the rotational speed of the engine are held in the register 374.

Among the data calculated at CPU, the data $T_i$ or $T_{ACCEL}$ indicating the fuel injection time produced from the injector 12 is set at a register 352. A counter 358 begins to count the clock pulses when the CPU produces the initial load pulse INTLD or an acceleration injection start signal ACC. Specifically, when the initial load pulse INTLD is produced, a flip-flop 348 is temporarily set so that the two input signals of a comparator 350 become high. The output of the comparator 350 is produced and a flip-flop 354 is set, thus opening an AND gate 356. When the signal ACC is produced, on the other hand, a flip-flop 346 is temporarily set with the result that the two inputs of the comparator 350 are both reduced to low level, so that the output of the comparator 350 is produced. The flip-flop 354 is set and the AND gate 356 is opened. When the count of the counter 358 reaches a value set in the register 352, the output of a comparator 360 resets the flip-flop 354, thus stopping the operation of the counter 358. A flip-flop 362 is kept set only during the period when the counter 358 continues counting, and the Q output thereof is applied as a fuel injection signal ING to a solenoid for opening the injector 12. When the content of the register 351 is reduced to "0" by the CPU 108, incidentally, the output of the comparator 350 is blocked by an AND gate 353, and therefore the fuel injection signal INJ is not produced.

Figure 4:
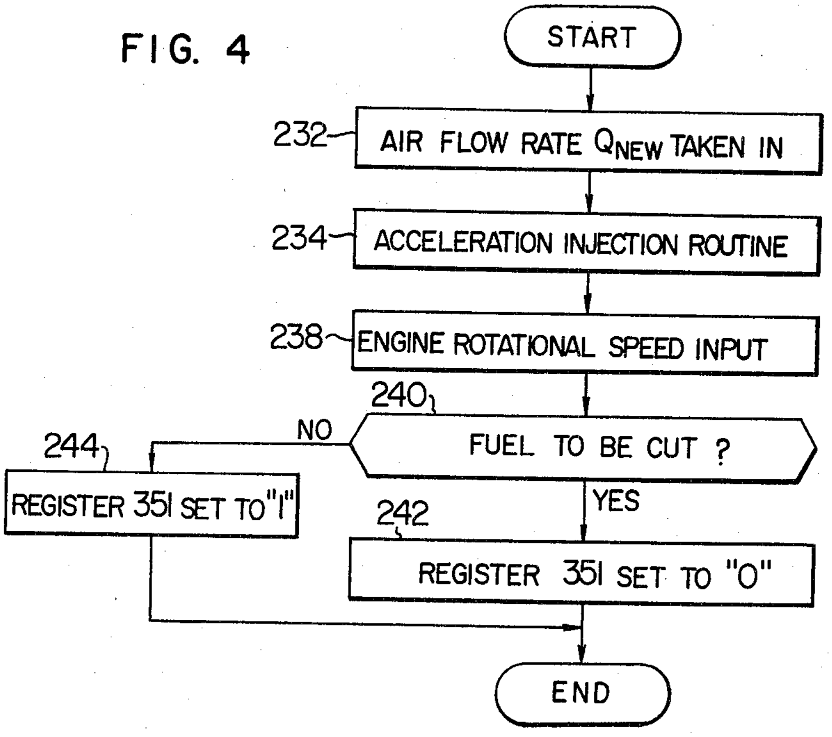
FIGS. 4, 5 and 6 are flowcharts respectively showing the tasks carried out in CPU 108.

FIG. 4 shows one of the tasks performed in predetermined cycles. According to the embodiment under consideration, the task shown in FIG. 4 is started by an interval interruption signal produced every 10 msec from a timer (not shown) arranged in the control circuit 70.

When the task is started, the air flow rate $Q_{NEW}$ is introduced to a step 232. At the next acceleration injection routine 234, it is decided whether or not the engine is being accelerated, and fuel injection is accelerated according to the result of this decision.

Further, at a step 238, the data on the engine rotational speed required for control of the ignition timing control is obtained, followed by transfer to the next step 240. At the step 240, it is decided whether or not the fuel supply should be cut according to the data on the engine rotational speed held in the latch register 374 and the engine water temperature detected by the cooling water temperature sensor 56. When it is decided that the fuel should be cut at the step 240, transfer is made to a step 242, where a register 351 is set at "0", thus stopping the supply of fuel.

In the event that it is decided that the fuel should not be cut at the step 240, on the other hand, the register 351 is set at "1" at a step 244.

Thus the task started by interval interruption in cycles of 10 msec is completed.

Figure 5:
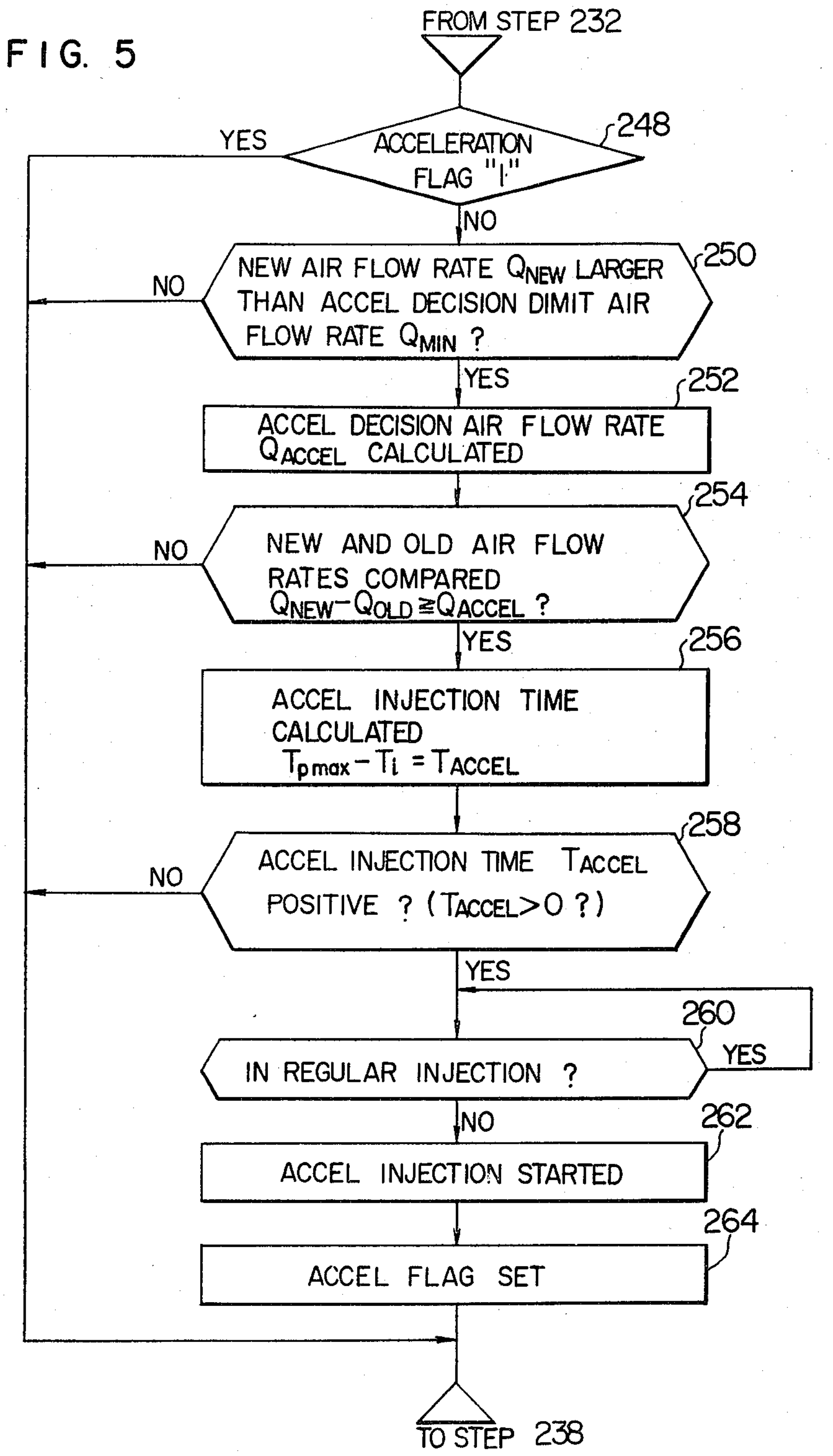

A process flow of the acceleration injection routine 234 is shown in FIG. 5. First, it is decided at a step 248 whether or not the acceleration flag is "1". This acceleration flag is installed in the random access memory 112, and is set by the task started in synchronism with the engine rotation as explained later, while it is reset when acceleration injection is started at the acceleration injection routine. Thus when the acceleration flag is set at the step 248, it indicates that an acceleration injection has already made in an interval in synchronism with the engine rotation. In that case, a jump is made directly to the step 238 where the data on the engine rotational speed is fetched and the decision as to acceleration is not made in this routine. If the acceleration flag is not "1", by contrast, i.e., it is decided that the acceleration injection has not yet made, transfer is made to a step 250. At this step 250, it is decided whether or not the flow rate of intake air at the time of the acceleration decision (hereinafter referred to as the new air flow rate) $Q_{NEW}$ is larger than the acceleration decision limit air flow rate $Q_{MIN}$, namely, whether or not the air flow rate $Q_{NEW}$ is fetched in the range of acceleration decision. The acceleration decision range is provided for the reason that there is no need for acceleration decision in the case where the engine operation is in idle range or powered range. In the case where the new air flow rate $Q_{NEW}$ is not larger than the acceleration decision limit air flow rate $Q_{MIN}$ at the step 250, on the other hand, there is no need to make a decision on the acceleration, and a jump is made to the step 238. In the case where the new air flow rate $Q_{NEW}$ is larger than the acceleration decision limit air flow rate $Q_{MIN}$, by contrast, transfer is made to a step 252 where the calculation of the flow rate of air on the acceleration decision (acceleration decision standard value) $Q_{ACCEL}$ is made. The value $Q_{ACCEL}$ is given by the equation below.

$$Q_{ACCEL}=k_1 \cdot Q_{NEW} \quad (1)$$

where $k_1$ is a constant which is 0.1 in this embodiment.

At a step 254, it is decided whether or not the difference between the new air flow rate $Q_{NEW}$ and the air flow rate (old air flow rate) $Q_{OLD}$ obtained one cycle before the acceleration decision is more than the acceleration decision air flow rate $Q_{ACCEL}$ calculated at the step 252. And in the case where it is decided at the step 254 that the difference between the new air flow rate $Q_{NEW}$ and the old air flow rate $Q_{OLD}$ is smaller than the acceleration decision air flow rate $Q_{ACCEL}$, it is found that the engine is not in accelerated condition, and a jump is made to the step 238. In the case where the difference between the new air flow rate $Q_{NEW}$ and the old air flow rate $Q_{OLD}$ is larger than the acceleration decision air flow rate $Q_{ACCEL}$, by contrast, that is, in the case where it is decided that an accelerated condition is involved, transfer is made to a step 256, where the acceleration injection time is calculated. The acceleration injection time $T_{ACCEL}$ is obtained from the equation below.

$$T_{pmax}-T_1=T_{ACCEL} \quad (2)$$

where $T_{pmax}$ is a predetermined maximum basic fuel injection time. This value can be determined according to the following concept:

$$T_{pmax}=k_2 \cdot (Q_{max}/N_{max}) \quad (3)$$

where $Q_{max}$ is the intake air flow rate for the maximum value of the ratio of intake air flow rate to the engine rotational speed, and $N_{max}$ is the engine rotational speed corresponding of the value $Q_{max} \cdot k_2$ is a factor.

The acceleration injection time $T_{ACCEL}$ calculated at the step 256 is the regular injection time, and a theoretical acceleration injection time at which injection is possible. This regular injection time is not actually coincident with the actual acceleration injection time but does not provide any inconvenience in practical applications. It is also possible to change the sensitivity of detection of the acceleration by appropriately determining the value of the constant $k_1$ in the above equation (1).

At the next step 258, it is decided whether or not the acceleration injection time $T_{ACCEL}$ calculated at the step 256 is larger than zero. In the case where it is decided at the step 258 that the acceleration injection time $T_{ACCEL}$ is not larger than zero, then a jump is made to the step 238. If the acceleration injection time $T_{ACCEL}$ is larger than zero, on the other hand, transfer is made to a step 260, where it is decided whether or not the present injection is a regular one. In the case where it is decided at the step 260 that the regular injection is involved, this condition is maintained for the time being, and at the time point of completion of the regular injection, namely, at the time point when it is decided at the step 260 that the regular injection is not involved, transfer is made to a step 262, so that the acceleration injection is started, while at the same time setting the acceleration flag in the random access memory 112 at a step 264.

With the starting of the acceleration injection at the step 262, the above-mentioned acceleration injection time $T_{ACCEL}$ is set at the register 352, and an acceleration injection start signal ACC is applied to the flip-flop 346.

Figure 6:
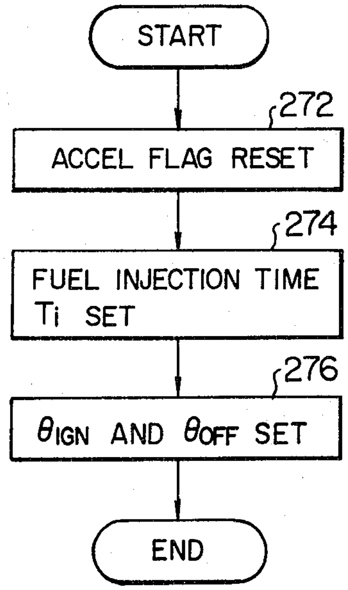

FIG. 6 shows a task carried out in cycles in synchronism with the engine rotation at the CPU 108. In this embodiment, the crank angular pulse REF generated from the crank angle sensor 72 for each 180-degree rotation of the engine is applied to the CPU 108, so that an initial interruption occurs, whereby the task shown in FIG. 6 is actuated. Thus the task is actuated in cycles of 50 msec in the case of the engine rotational speed of 600 r.p.m. and 7.5 msec in the case of the engine rotational speed of 400 r.p.m. With the actuation of this task, the acceleration flag set at the step 264 of the acceleration injection routine in FIG. 5 is reset at a step 272 first of all. At the next step 274, the normal or regular fuel injection time $T_i$ is set. The value $T_i$ is calculated by the CPU 108 at another task different from the task shown in FIG. 6. The equation below represents an example of the calculation formulae for calculating the regular fuel injection time $T_i$.

$$T_i=\alpha\cdot T_p\cdot(1+K_w+K_s+K_D+K_{MR}+K_{ACC}) \quad (4)$$

where $\alpha$ is an air-fuel ratio correction factor, $K_w$ a water temperature correction factor, $K_s$ an afterstart correction factor, $K_D$ an after-idle correction factor, $K_{MR}$ a mixing ratio correction factor, and $K_{ACC}$ an acceleration correction factor. These various correction factors are for correcting the basic fuel injection time depending on the engine operating conditions and the ambient conditions of the engine. The basic fuel injection time $T_P$ is calculated from the equation below.

$$T_P=k_3\cdot(Q_A/N) \quad (5)$$

where $k_3$ is a constant determined by the injector, N the engine rotational speed, and $Q_A$ the intake air flow rate.

The amount $Q_A/N$ corresponds to the magnitude of the engine load. Therefore, the regular fuel injection time $T_1$ can be considered a fuel injection time calculated on the basis of the engine load. In this way, the regular fuel injection time $T_1$ that has been calculated at the CPU 108 is set in the register 352 in FIG. 3 at the step 274.

At a step 274, the dwell angle $\theta_{OFF}$ and the ignition advance angle $\theta_{IGN}$ calculated at the CPU 108 are set in the registers 324 and 322 respectively shown in FIG. 3.

Thus the task actuated by the initial interruption in synchronism with the engine rotation is completed.

Figure 7:
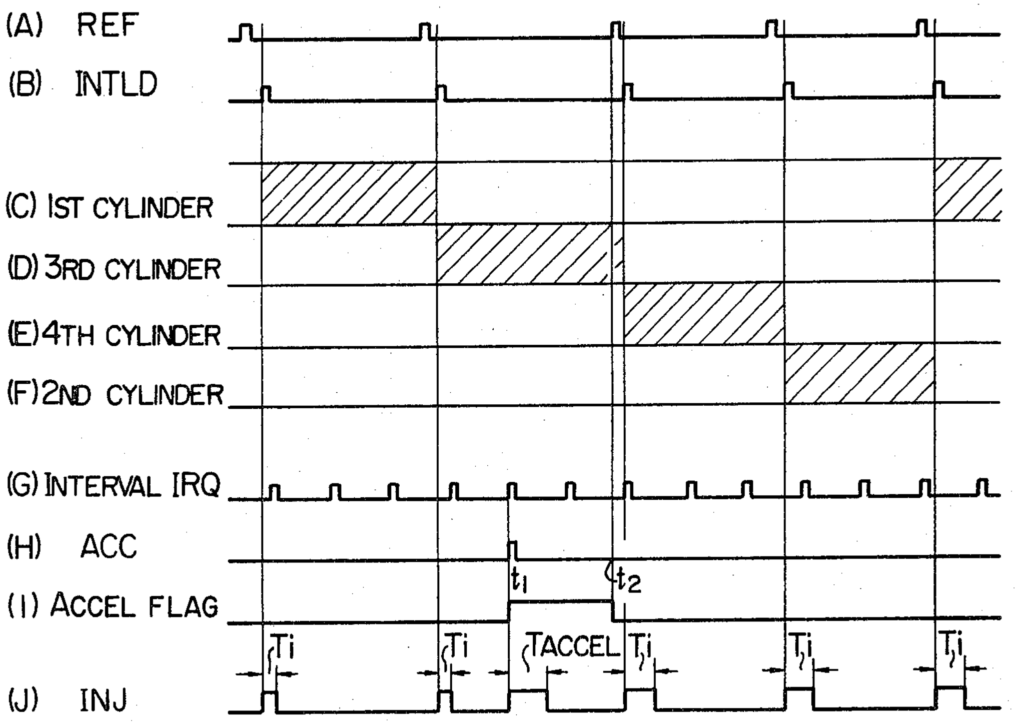
FIG. 7 is a time chart showing the operation executed according to the tasks of FIGS. 4, 5 and 6.

The operation of the above-mentioned embodiment is shown in FIG. 7. FIG. 7(A) shows a crank angle pulse REF generated from the crank angle sensor 72, which signal actuates the task of FIG. 6 FIG. 7(B) shows the initial load pulse INTLD delayed slightly from the crank angle pulse REF, which pulse starts the regular fuel injection for the time period $T_1$. FIGS. 7(C), 7(D), 7(E) and 7(F) show the intake processes of the respective cylinders. FIG. 7(G) shows an interval interruption that occurs in regular cycles of time. This interruption causes the actuation of the task shown in FIGS. 4 and 5. FIG. 7(H) illustrates the acceleration injection start pulse ACC generated from the CPU 108 under the task actuated by the interval interruption. FIG. 7(I) shows an acceleration flag which is set simultaneously with the generation of the acceleration fuel injection start pulse ACC at time point $t_1$, and reset by the task actuated by the crank angle pulse REF. During the period when this flag is set, the acceleration injection is not carried out repeatedly.

As described above, according to the present embodiment, only one acceleration injection is made during each intake process of an engine cylinder. Also, if the acceleration injection is made during a given intake process of a cylinder, the fuel injection time during the particular intake process ($T_i+T_{ACCEL}$) is always kept at a value of $T_{pmax}$ set in advance.

In the above-described embodiment, the decision as to whether or not the engine is in an accelerated condition is made by the rate of change in the air flow rate detected by the air flow sensor 24. As an alternative, the accelerated condition of the engine may be detected by a fact that a rate of change in a suction pressure VC detected by the pressure sensor 25 provided in the intake manifold 6 shown in FIG. 1 exceeds a predetermined level. As another alternative, it may be decided by the change in the opening of the throttle valve 14.

We claim:

1. In an engine control system with a processor comprising a plurality of sensors each indicating a parameter including at least load information of an engine, said each sensor generating a signal to be applied to said processor, actuator means for controlling the amount of the fuel injected to said engine according to the data calculated by said processor, and an input-output device for connecting said sensors, said actuator means and said processor; an engine operation control method comprising a first step of activating said actuator means in accordance with the regular fuel injection time calculated on the basis of a parameter representing said load information of the engine in cycles corresponding to the intake process of the engine cylinder, a second step of deciding in predetermined cycles whether the engine is in an accelerated condition, and a third step of injecting the fuel by activating said actuator means for a length of time equal to a predetermined reference maximum fuel injection time less said regular fuel injection time, said fuel injection being effected only once in each interval of the operation of said first step, in the case where it is decided at said second step that the engine is in an accelerated condition.

2. A method of engine operation control according to claim 1, wherein it is decided at said second step that the engine is in an accelerated condition when the rate of change in the amount of intake air in the engine exceeds a predetermined value.

3. A method of engine operation control according to claim 1, wherein it is decided at said second step that the engine is in an accelerated condition when the rate of change in the suction pressure of the engine exceeds a predetermined value.

4. A method of engine operation control according to claim 1, wherein it is decided at said second step whether the engine is in an accelerated condition, by a change of the opening of the throttle valve.

5. In an engine control system with a processor comprising a plurality of sensors each indicating a parameter including at least load information of the engine, said each sensor generating a signal to be applied to said processor, actuator means for controlling the amount of the fuel injected into said engine according to the data calculated by said processor, an input-output device for connecting said sensor, said actuator means and said processor, and memory means for storing a program and data; a method for engine operation control comprising a first step of activating said actuator means in accordance with a regular fuel injection time calculated on the basis of a parameter indicative of said engine load information, in cycles corresponding to the intake process of an engine cylinder, a second step of resetting an acceleration flag allotted to part of said memory means, in response to said first step, a third step of deciding, in predetermined cycles, whether said engine is in an accelerated condition, only when said acceleration flag is set, a fourth step of injecting the fuel by activating said actuator means for a time period equivalent to a predetermined reference maximum fuel injection time less said regular fuel injection time, only in the case where it is decided at said third step that the engine is in an accelerated condition, and a fifth step of setting said acceleration flag in response to said fourth step.

* * * * *